US005418405A

United States Patent [19]

Takasaki

[11] Patent Number: 5,418,405

[45] Date of Patent: May 23, 1995

[54] INSTALLATION PATH NETWORK FOR DISTRIBUTION AREA

[75] Inventor: Yoshitaka Takasaki, Tokorozawa, Japan

[73] Assignee: Hitachi, Ltd., Tokyo, Japan

[21] Appl. No.: 940,235

[22] Filed: Sep. 3, 1992

[30] Foreign Application Priority Data

Sep. 3, 1991 [JP] Japan .................................. 3-222699

[51] Int. Cl.[6] ........................ H04H 1/02; H01B 11/00; H02G 1/00

[52] U.S. Cl. ...................................... 307/147; 307/11; 455/3.1

[58] Field of Search ........................... 307/147, 11, 38; 361/601, 602, 622, 627, 641; 174/37, 38, 39, 40 R, 43, 44; 358/86; 455/3.1, 3.3, 6.1, 6.3; 348/6–8

[56] References Cited

U.S. PATENT DOCUMENTS

| | | | |
|---|---|---|---|
| 343,087 | 6/1886 | Stieringer et al. | 307/157 |
| 370,955 | 10/1887 | Le Vin | 174/38 |
| 380,757 | 4/1888 | Hart et al. | 174/38 |
| 473,932 | 5/1892 | Kintner | 307/147 |
| 3,404,211 | 10/1968 | Nicholson | 174/37 X |
| 3,457,428 | 7/1969 | Perry | 174/37 X |
| 3,751,670 | 8/1973 | Grodner et al. | 358/86 X |
| 4,290,142 | 9/1981 | Schnee et al. | 455/3.1 |
| 4,768,188 | 8/1988 | Barnhart et al. | 370/80 |
| 5,043,531 | 8/1991 | Gutenson et al. | 174/49 |
| 5,172,413 | 12/1992 | Bradley et al. | 455/3.1 X |
| 5,216,569 | 6/1993 | Brookhiser | 361/107 |

FOREIGN PATENT DOCUMENTS 748776 5/1956 United Kingdom .................. 358/86

OTHER PUBLICATIONS

"A Study of Node Placement for Video Distribution Services in Optical Subscriber Loops"; Morita et al; NTT Telecommunication Network Labs; vo. 90, No. 70; pp. 13 & 15; 1990.

*Primary Examiner*—A. D. Pellinen
*Assistant Examiner*—Fritz M. Fleming
*Attorney, Agent, or Firm*—Fay, Sharpe, Beall, Fagan, Minnich & McKee

[57] ABSTRACT

Installation paths for routing cables or wire in a distribution service area emanate from a center point and extend outwardly to several distribution areas. Each distribution area has a plurality of subscriber stations with subscriber line extending between a distribution point for the distribution area and each of the stations. The distribution points for each of the distribution areas are connected to the center point of the distribution service areas by feeder lines. The installation paths that extend through the distribution areas adjacent the center point have both feeder lines and subscriber lines. Thus, the total length of the installation path network is shortened by the sharing of the installation paths. Further, the distribution points for each of the distribution areas is selected to be the one closest to the center point for the distribution system.

11 Claims, 11 Drawing Sheets

INSTALLATION PATH NETWORK FOR DISTRIBUTION AREA

BACKGROUND OF THE INVENTION

1. Field of the Invention

The invention relates to an installation path network for distribution areas having multiple subscriber stations arranged in a plurality of adjacent distribution areas.

2. Description of Related Art

Multiple subscriber stations serviced by a network of installation paths are known wherein the subscriber stations are interconnected to each other through subscriber lines within a distribution area emanating from a common distribution point for the distribution area. The entire system, which has a plurality of the distribution areas, is serviced from a center point with feeder lines connecting the distribution points for each of the distribution areas to the center point.

A conventional system is shown and discussed in "A Study on Node Placement for Video Distribution Services and Optical Subscriber Loops" in the Technical Research Report CS90-3, published by the Institute of Electronics, Information and Communication Engineers in Japan. In the disclosed distribution system, the nodes are placed at the center of each distribution area, as shown in FIG. 3 of the report. Such placement of the nodes is conventional, and the typical topology of an installation system requires that the distribution points or nodes for each distribution area be located in the center of the area.

The installation path or route topology having a distribution point or node in the center of each distribution area has advantages directed to the distribution of information throughout each distribution area. The performance of such a system, however, is not only judged by its effective distribution of information throughout the distribution area, but also by the cost for installing the route system in order to implement the distribution of information throughout the surface area.

Recently, the cost of the line or cable does not contribute to the greatest cost for installing the distribution network. The cost of the cable is being reduced as the result of mass-production, however, the cost of routing the cable or line throughout the distribution area is increasing due to labor costs. Each route that the cable or line follows requires an installation path for the route. Such installation paths are created by digging trenches or gutters for burying ducts or conduit through which the cable or line passes, erecting poles or stringing lines or cables between the poles for aerial route instruction, or just directly burying the line or cable. Recently, underground installation has been found to be more favorable in view of concerns about the environment and the aesthetics of aerial route installation.

SUMMARY OF THE INVENTION

It is an object of the invention to reduce the cost of the cable installation by focusing on minimizing the length of the installation paths provided for in the construction of the distribution area. Preferably, a route topology that minimizes the construction cost per subscriber station by permitting installation paths or routes to share as many cables or lines as possible is achieved by the present invention.

FIG. 2 shows a conventional route topology for a service area having a plurality of subdivided and adjacent distribution areas. According to the conventional system shown in FIG. 2, each distribution area is considered to be a square area of one unit dimension in length and width. The service area is subdivided into sixteen (16) distribution areas, each having sixteen (16) subscriber stations 5. The center point 1 of the service area provides a central distribution point for the distribution areas. Feeder lines 2 extend outwardly from the center point to reach each of the distribution areas. Within each distribution area, a centrally positioned distribution point 3 is provided. Subscriber lines 4 within the distribution area link each of the subscriber stations to the distribution point.

An analysis of the route topology of the conventional installation network shown in FIG. 2 shows that the total length of the installation paths can be determined from the subtotal lengths of the feeder line installation paths and the subscriber line installation paths with respect to the unit dimension represented by the length and width of each distribution area. As shown, there are five feeder lines 2, each extending for three units. Additionally, there are five subscriber lines 4 for each of the sixteen distribution areas, each extending $\frac{3}{4}$ of one unit measure. The total installation path network, therefore, equals 75 measurement units, the significance of which will be discussed hereinafter with respect to the description of the preferred embodiments of the invention.

It is an object of the invention to minimize the cost of installation for a network of installation paths within a distribution area by positioning the distribution point for the distribution area to be nearest to the center point for the service area. In particular, for rectangularly subdivided system areas, it is preferred to position the distribution point in a corner of each rectangularly shaped distribution area nearest to the center point for the system area.

It is an object of the invention to minimize the total length of the installation path network by combining feeder and subscriber cables or lines in single installation paths within a plurality of the distribution areas for a system or service area that is serviced by the distribution system.

It is an object of the invention to minimize the total length of the network of installation paths for the distribution system by providing a feeder line common to all subdivided distribution areas that extends in one direction through all such areas and connects together the distribution points for each of the distribution areas.

It is an object of the invention to recognize that in the installation of a distribution system for multiple subscriber stations, some subscriber stations require immediate connection to the system, whereas other subscriber stations may be connected to the systems in the future, or not at all depending upon circumstances not known at the time of initially installing the distribution system.

DESCRIPTION OF THE PREFERRED EMBODIMENTS OF THE INVENTION

Figure 1A:
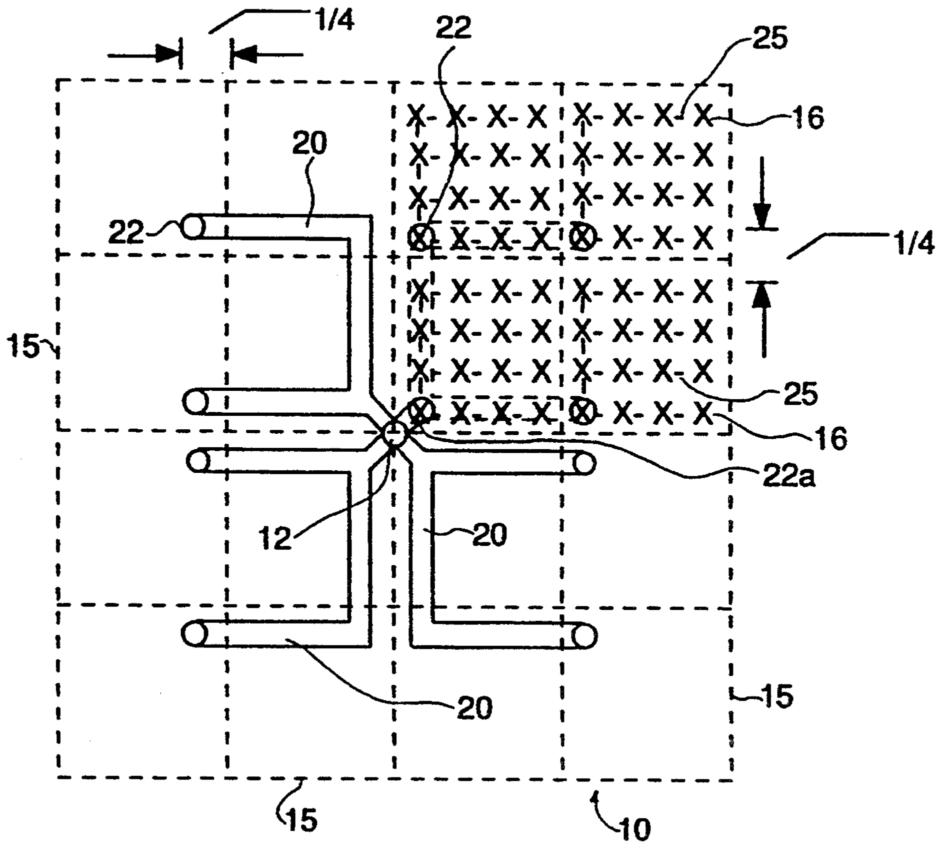
FIG. 1A–FIG. 1C are diagrams of a network of installation paths for feeder and subscriber cables or lines according to the present invention.

FIG. 1A is a diagram showing a distribution system or service area 10 subdivided into a plurality of distribution areas 15. Each of the distribution areas 15 has a plurality of subscriber stations 16, each denoted by an "X". Feeder lines 20 connect from a center point 12 of the system area to each of the distribution areas 15. Subscriber lines 25 connect each of the subscriber stations to a distribution point 22 along the feeder lines.

In a typical system, both the feeder lines 20 and the subscriber lines 25 are fiber optic cables. In another system, the feeder lines 20 are fiber optic cables and the subscriber lines 25 are copper cables. In the latter system, each of the distribution points 22 is provided with a remote multiplexer. On the other hand, it is recognized that, in the practical sense, there may be some subscriber stations that are not used initially upon installation of the system or not at all over the life of the system. For purposes of explanation, however, it is assumed that each subscriber station in the system is to be connected.

In order to install the route topology of the distribution system, the distribution lines, including the feeder lines and subscriber lines are either buried or strung aerially throughout the distribution system. Recently, buried distribution systems have found wide acceptance as a result of their compatibility with environmental and aesthetic concerns. Buried installation paths include the direct burial of the cable lines, or the burial of conduit or duct in trenches or gutters in the ground through which the cables or lines are routed. For aerial installation paths, the lines or cables are strung between poles or other type structures to implement the desired route topology.

According to the object of the invention, the installation path network for the distribution lines is minimized by positioning the distribution points 22 for each of the subdivided distribution areas 15 nearest to the center point 12 for the distribution system area. In particular, the embodiments of the invention shown in FIGS. 1A–1C, 4A–4C and 5A–5G show that the distribution points 22 for each distribution area 15 are not in the center of the distribution area, as in the conventional route topology for distribution systems shown in FIG. 2, for example, but are rather preferably in a position nearest to the center point 12.

For purposes of illustration, the distribution areas 15 are considered to be square or rectangular, but they may take any shape in the application of such an installation of the system. Despite the shape of each of the subdivided areas, it is contemplated that there will be a distribution point in common with a subscriber station or superimposed on a subscriber station from the route topology point of view that is nearest to the center point 12 for the system.

FIG. 1A discloses a preferred embodiment of the invention. Sixteen distribution areas 15 are provided in the distribution system or service area shown in FIG. 1A, but only the subscriber stations for the upper right quadrant of the system area are shown in detail. It is understood that a plurality of subscriber stations 16 exist in each of the distribution areas 15 even though they are not shown.

Figure 1B:
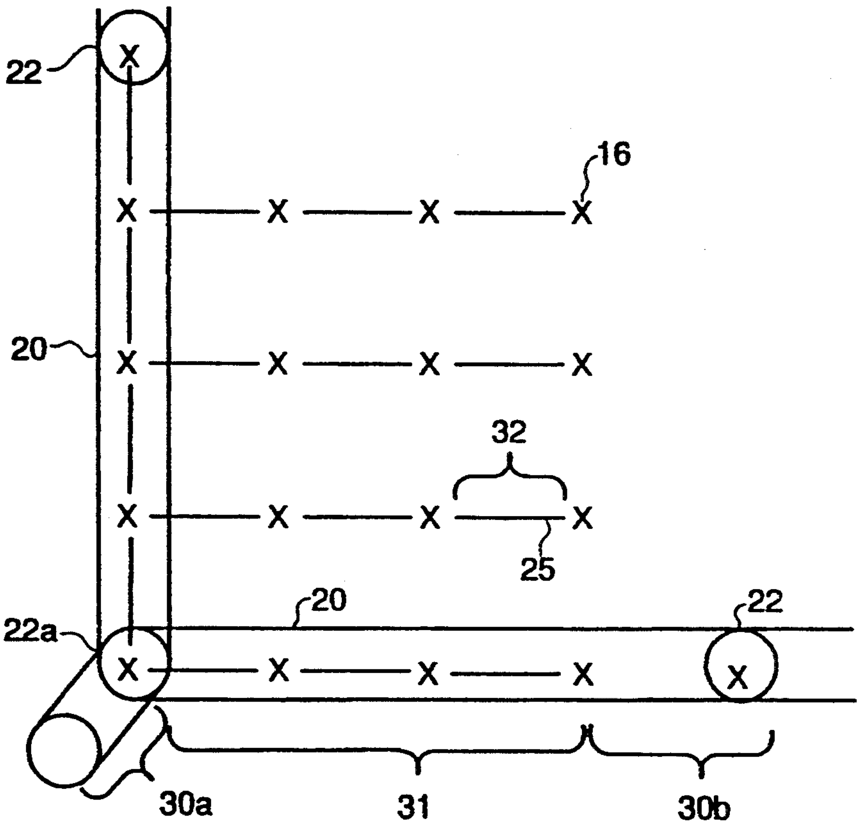

The service area 10 of the system shown in FIG. 1A is provided with a center point 12. There are three types of installation paths provided within the system or service area 10 as is shown in FIG. 1B. The installation paths 30*a* are of the shortest length and extend from the center point 12 to the four innermost distribution points 22*a*, only one of which is shown for clarity. Within the installation paths 30a are contained only feeder lines 20. Branching out from the distribution points 22*a*, are the second type of installation paths 31 that contain feeder lines 20 and subscriber lines 25. Finally, within each distribution area 15, there are installation paths 32 for just the subscriber lines 25, both of which are indicated by hyphens or dashes between the subscriber stations 16.

Figure 2:
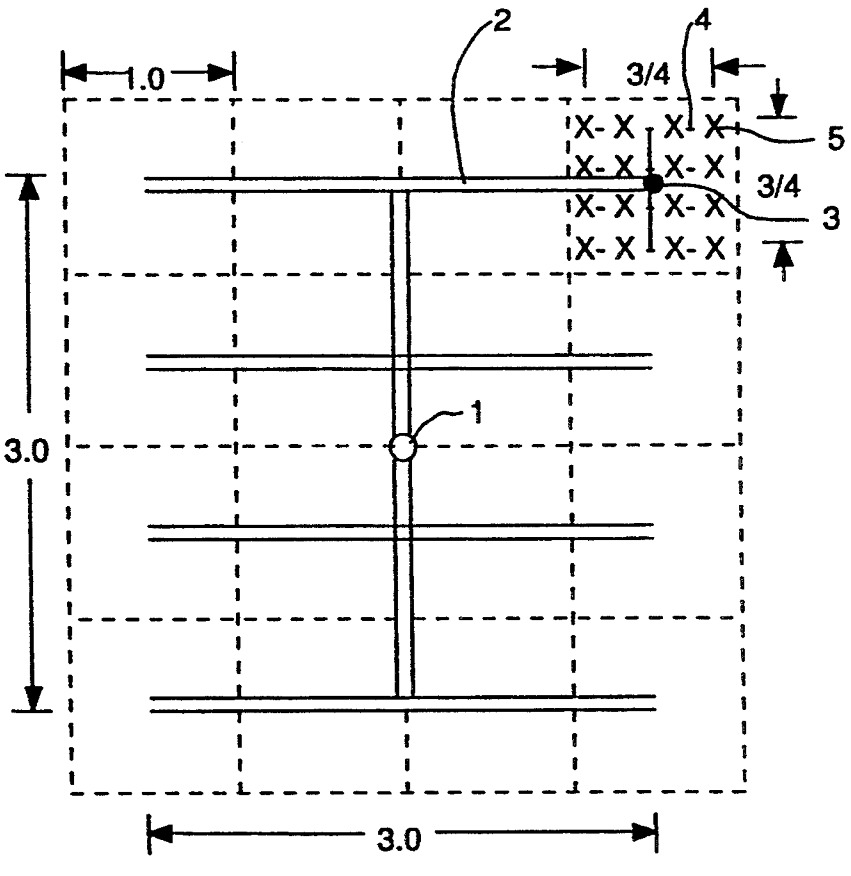
PRIOR ART FIG. 2
FIG. 2 is a diagram of a conventional route topology of feeder and subscriber lines for a distribution system having a plurality of subdivided distribution areas.

The inner four distribution areas 15 have two sections of installation paths 31 that accommodate both feeder and subscriber lines or cables. The direction along which installation paths 31 extend is in alignment with the subscriber stations so that both the subscriber lines 25 for a particular distribution area and the feeder lines 20 for that distribution area as well as the subscriber lines for the adjacent distribution area, for example, adjacent in the extending direction of the feeder lines 20, are accommodated in one installation path 31. Further, the distribution point 22*a* for each of the distribution areas 15 having the two installation paths 31 contained therein are located at an intersection of the two installation paths. In this way, the total network installation path length of the network is reduced in comparison to that of the installation path network shown in FIG. 2, representing a conventional system.

The total length of the installation path network in FIG. 1 can be determined from adding the installation path lengths for installation paths 31 and 32 in addition to the installation path sections 30*a* and 30*b* that accommodate just feeder lines. In particular, there is one column and four rows of subscriber lines 25 housed in either one or the other of the subscriber line installation paths 32 and combined feeder and subscriber installation paths 31 in a distribution area 15. Combined, these installation paths provide a total length of $\frac{3}{4}\times5\times16=60$. The installation paths 30*b*, are for feeder lines only. Feeder line installation paths 30*b* extend across one quarter unit dimension, and there are 12 such sections producing a combined length of three units. Lastly, there are four diagonally extending feeder line installation path sections 30*a* that are $\sqrt{2}/2$ in unit dimension, thus providing for a total unit length of approximately 0.7 units. Accordingly, the total installation path length for the network of the system distribution area 10 is 63.7 units of measure, compared with 75 units of measure for the installation path network for the system shown in FIG. 2.

Figure 1C:
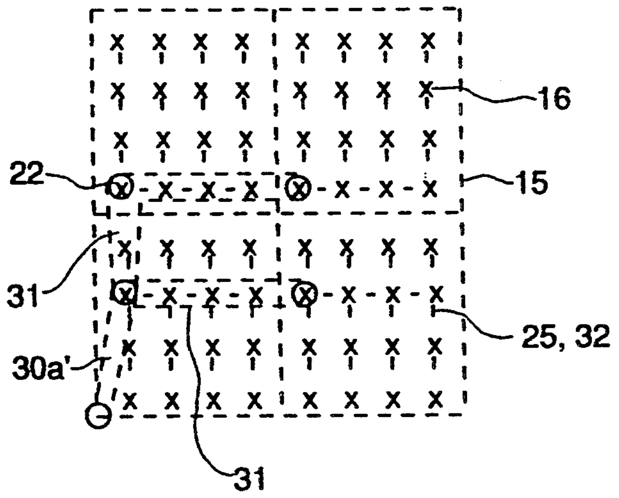

In FIG. 1C, an alternative embodiment for the route topology of the feeder installation paths is shown. In addition to the installation paths 30*a* for only the feeder lines, there are still two combined feeder and subscriber line installation paths 31 for an inner quadrant distribution area 15 have different positions as compared with the positions shown in FIG. 1A, but the intersection of the two installation paths still provides the location of the distribution point 22 for that distribution area.

Figure 3A:
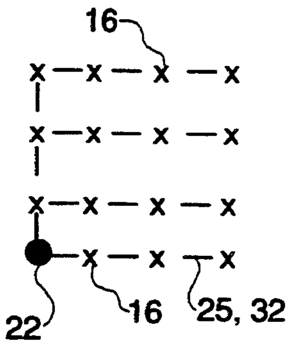
FIG. 3A–FIG. 3F each show different embodiments of a single distribution area having multiple subscriber stations with subscriber lines interconnecting the stations from a common distribution point.
Figure 3B:
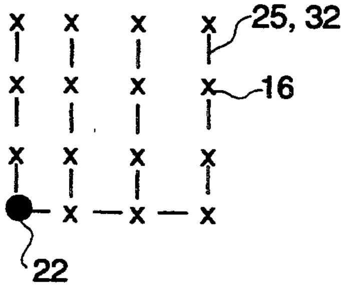
Figure 3C:
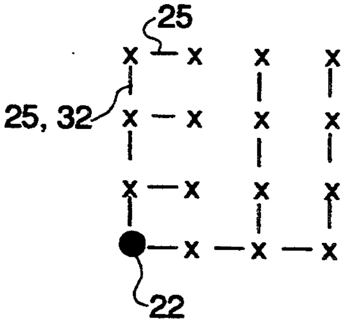
Figure 3D:
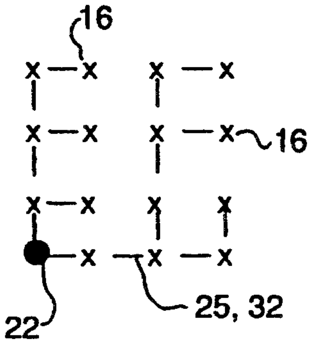
Figure 3E:
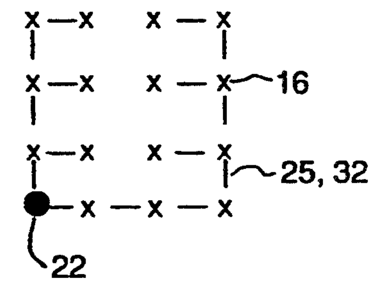
Figure 3F:
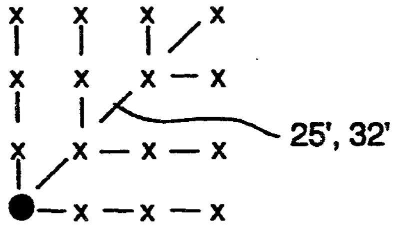

For purposes of discussion, the subdivided distribution areas 15 are shown as being square areas, but any shape that is required to properly subdivide the system area 10 can be used as long as the distribution point for each of the areas is nearest to the center point 12 for the overall system area. Further, although the connection of subscriber stations 16 is shown in FIGS. 1A and 1B to be like that shown in FIG. 3A for each distribution area 15, the subscriber station connections, i.e., the topology of the subscriber lines 25, can be changed according to FIGS. 3B–3E without changing the above given estimation of total length of the installation path network. Further, the subscriber lines 25 can be arranged like that shown in FIG. 3F if required, wherein subscriber lines 25′ and the corresponding installation paths 32′ extend diagonally through the distribution area. For the topology of FIG. 3F, the estimate of total length of the installation path network would be increased with respect to that for the other embodiments.

In FIGS. 5A–5G, additional modifications to the subscriber line connections of subscriber stations 16 to the distribution point are shown. In the connection representations shown in FIG. 5A–5G, it is determined that certain subscriber stations 16*a* need to be connected to the distribution system initially, whereas other subscriber stations 16*b* will be connected later, or not at all, depending upon the circumstances. Thus, the modifications shown in FIGS. 5A–5G represent initial connections of subscriber stations that can be achieved upon initial installation of the system and which allow connection of other subscriber stations at a later time by merely stringing a subscriber line from one subscriber station in use to an adjacent station in order to bring the adjacent subscriber station on line.

Figure 5A:
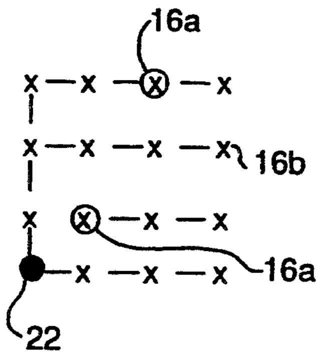
FIGS. 5A–5G are diagrams showing the selective connection of subscriber stations to a common distribution point within a single distribution area, according to several modifications.
Figure 5B:
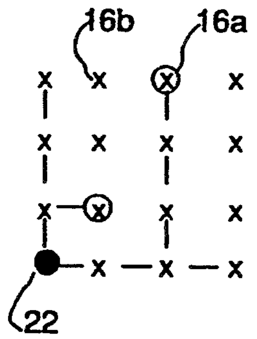
Figure 5C:
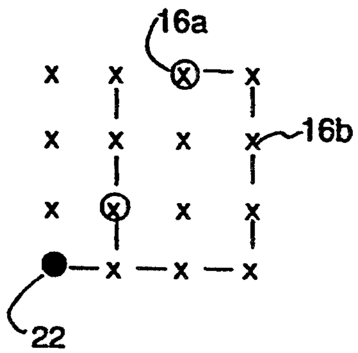
Figure 5D:
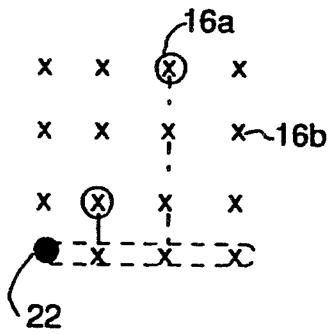
Figure 5E:
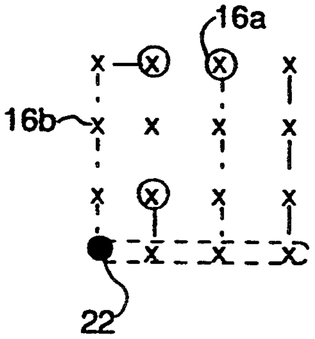
Figure 5F:
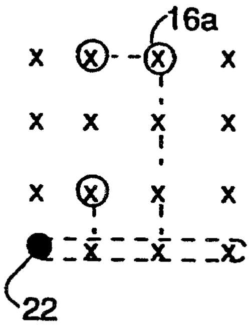
Figure 5G:
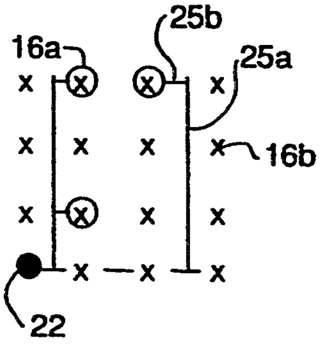

In particular, the modification to the route topology shown in FIG. 5G provides an installation path for the subscriber lines that is preferred for aerial installations. The subscriber lines 25*a* extend between adjacent rows of the subscriber stations 16, while subscriber lines 25*b* leading therefrom extend to each of the individual stations that are connected to the system.

Figure 7A:
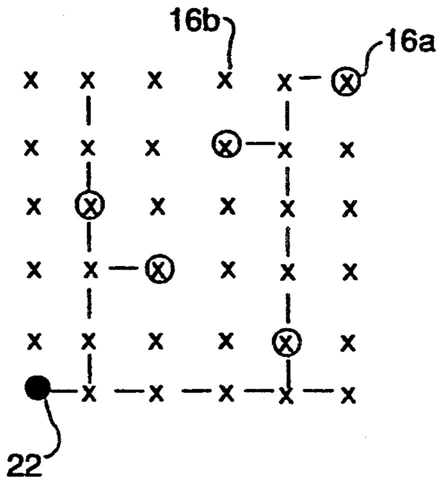
FIGS. 7A and 7B each show a diagram of selective connection of multiple subscriber stations within a single distribution area according to preferred embodiments of the invention.
Figure 7B:
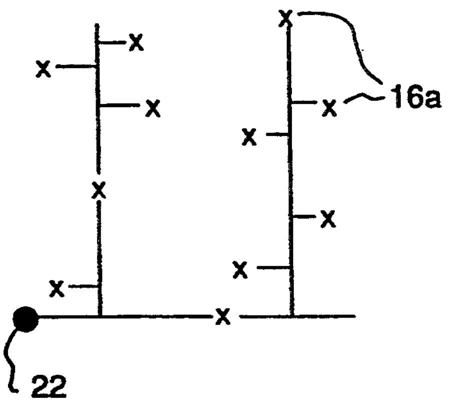

In FIG. 7A, a representative distribution area having thirty-six planned subscriber stations is shown. FIG. 7A shows that predetermined ones of the subscriber stations 16*a* that are to be initially connected to the system are connected to the distribution point 22 through subscriber lines whereas the remainder of the planned subscriber stations are not yet connected, but are easily connected to an adjacent subscriber station when needed in the future. By the configuration shown in FIG. 7A, only one subscriber line between adjacent subscriber stations is required in order to bring one of the subscriber stations not initially connected on line. In FIG. 7B, the diagram shows that although subscriber stations are not regularly placed, subscriber stations can be connected to the distribution point.

Figure 4A:
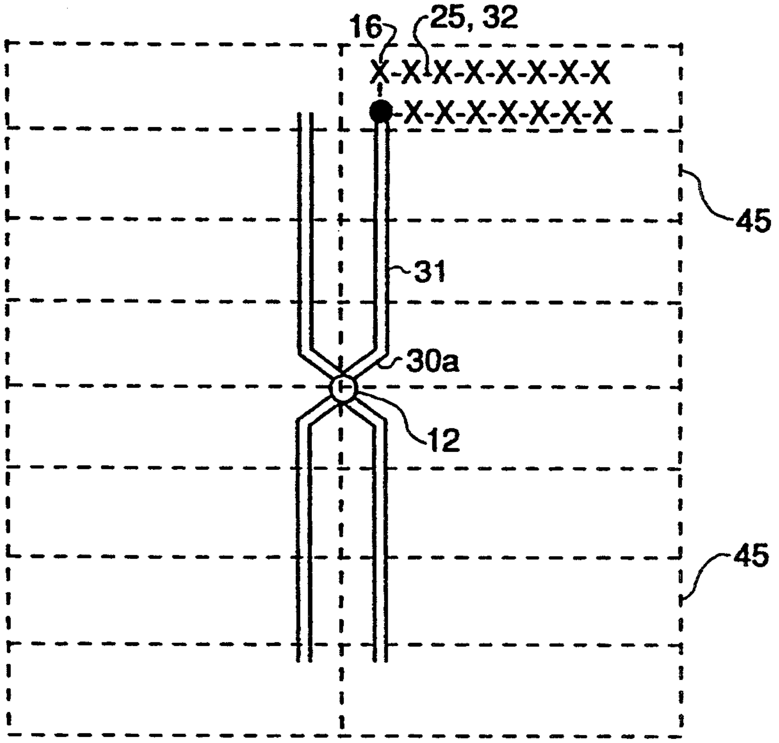
FIG. 4A is a diagram showing a network of installation paths for feeder and subscriber lines or cables according to another embodiment of the present invention.
Figure 4B:
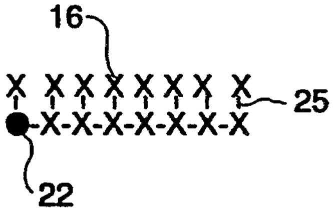
FIG. 4B is a diagram showing a single distribution area having multiple subscriber stations connected together by subscriber lines to a common distribution point.
Figure 4C:
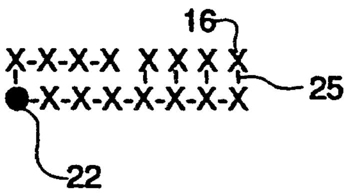
FIG. 4C is a diagram similar to FIG. 4B, but showing a modification of the subscriber line connection network within a distribution area.

FIG. 4A–4C shows another embodiment of the invention wherein the system area 10 to be serviced by the installation path network includes a center point 12 and a plurality of subdivided distribution areas 45. The distribution areas 45 are not square, as in the first embodiment of the invention.

The feeder lines are connected to the distribution areas 45 through feeder line installation paths 30*a* and combined feeder and subscriber installation paths 31 as with the other embodiments. In each distribution area 45, the distribution point is positioned in the distribution area at a location overlaying or superimposed on the subscriber station nearest to the center point 12. The subscriber stations 16 are connected by subscriber lines 25 that follow subscriber line only installation paths 32.

In FIGS. 4B and 4C, alternative configurations of the subscriber line connections, for example the topology of the subscriber lines 25 is shown. The distribution point 22 is shown to be located in the lower left hand corner, and although it is not shown, the distribution point is positioned nearest to the center point 12 of the distribution system area.

Figure 6:
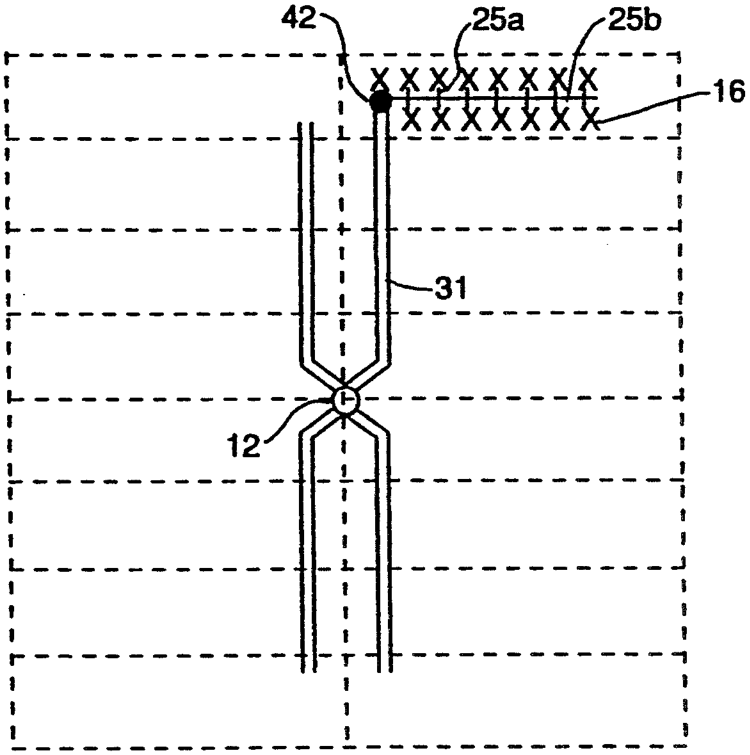
FIG. 6 is a diagram showing an embodiment of the installation path network for feeder and subscriber lines or cables according to the present invention.

In FIG. 6, an embodiment of the invention similar to that shown in FIG. 4A is shown. Like reference numerals indicate like features of the system area that is shown. The difference between the FIG. 6 embodiment and the FIG. 4 embodiments of the present invention is that the terminal distribution point 42 within distribution areas 45 is positioned midway between two rows of subscriber station 16, rather than in a position superimposed on the distribution station nearest to the center point 12 of the distribution system area as in the other embodiments.

According to the embodiment of FIG. 6, as in the embodiment of FIG. 5G, mutually shared subscriber lines 25*b* extend between adjacent rows of subscriber stations 16 with individual subscriber lines 25*a* extending therefrom to the respective subscriber stations. The embodiment of the invention in FIG. 6 includes the possibility that the installation paths for the subscriber lines 25*b* are buried, whereas the installation paths 25*a* are disposed in an aerial configuration with subscriber lines 25 aerially connected to each of the subscriber stations 16. According to the topology of this embodiment, the subscriber lines 25*a* can be aerially dropped from the mutually shared subscriber lines 25*b*.

While preferred embodiments of the invention have been shown and described with reference to the drawings, additional modifications and embodiments of the invention are contemplated to be within the scope of the invention, as defined by the claims.

We claim:

1. A distribution system for an area having a center point and being subdivided into distribution areas having a plurality of subscriber stations, said system having feeder lines connected from said center point to distribution points for each of said distribution areas and subscriber lines located within said distribution areas for connecting said subscriber stations with respective ones of said distributions points, comprising:

a network of installation paths including first installation paths for accommodating feeder lines, second installation paths accommodating subscriber lines, and third installation paths accommodating both said feeder and said subscriber lines;

a first plurality of said distribution areas each having at least two of said third installation paths; and said first plurality of distribution areas each having one of said distribution points at an intersection of said at least two third installation paths, wherein said third installation paths are connected from said center point to a second distribution point via a first distribution point, and at least one of the subscriber stations is located along one of the third installation paths between said first and second distribution points.

2. A distribution systems according to claim 1, wherein each said distribution area has a polygonal configuration, and said distribution point of each said first plurality of said distribution areas is located in a corner thereof nearest to said center point.

3. A distribution system according to claim 1, further comprising:

a second plurality of said distribution areas having at least one of said third installation paths; and a third plurality of said distribution areas having said second and third installation paths, wherein said first plurality of said distribution areas is grouped around said center point and said second and third plurality of said distribution areas are adjacent to said first plurality and disposed outwardly therefrom with respect to said center point.

4. A distribution system according to claim 3, wherein said distribution points of said second and third plurality of distribution areas are positioned nearest to said center point in common with one of said subscriber stations.

5. A distribution system according to claim 1, wherein said feeder lines are fiber optic cable and said subscriber lines are copper cable.

6. A distribution system according to claim 1, wherein said distribution areas are classified into a first group of distribution areas which are closer to the center point, and a second group of the distribution areas which are farther from said center point, and wherein each of said distribution points in said first group is connected to said distribution points in said second group but not to each other.

7. A distribution system for an area having a center point and being subdivided into distribution areas having a plurality of subscriber stations, said system having feeder lines connected from said center point to distribution points for each of said distribution areas and subscriber lines located within said distribution areas for connecting said subscriber stations with respective ones of said distributions points, comprising:

a network of installation paths including first installation paths for accommodating feeder lines, second installation paths accommodating subscriber lines, and third installation paths accommodating both said feeder and said subscriber lines;

each of said distribution areas having a respective one of said distribution points in common with one of said subscriber stations positioned nearest to said center point, wherein said third installation paths are connected from said center point to a second distribution point via a first distribution point, and at least one of the subscriber stations is located along one of the third installation paths between said first and second distribution points.

8. A distribution system according to claim 7, wherein said distribution areas are rectangular in shape and each of said distribution points is positioned in a corner of each of said distribution areas nearest to said center point.

9. A distribution system according to claim 7, wherein said distribution areas are classified into a first group of the distribution areas which are closer to the center point, and a second group of the distribution areas which are farther from said center point, and wherein each of said distribution points in said first group is connected to said distribution points in said second group but not to each other.

10. A method of installing a distribution system for an area having a center point and being subdivided into distribution areas having a plurality of subscriber stations, said system having feeder lines connected from said center point to distribution points for each of said distribution areas, comprising:

installing a network of installation paths for a first group of subscriber stations including installing first installation paths for accommodating said feeder lines;

connecting a predetermined group of said subscriber stations to said feeder lines with subscriber lines via a distribution point in each of said distribution areas that is positioned nearest to said center point;

installing second installation paths for accommodating both said feeder and said subscriber lines along routes connecting said first group of subscriber stations within said distribution areas and in a direction extending toward a distribution point for an adjacent said distribution area; and adding additional ones of said subscriber stations apart from said first group in accordance with an increase of demand for said subscriber stations.

11. A method of installing a distribution system according to claim 10, wherein a plurality of said distribution areas have two of said second installation paths accommodating said feeder and said subscriber line and wherein said distribution points are positioned at an intersection of said at least two second installation paths.

* * * * *